March 1, 1932.  G. B. SCHEIBELL  1,847,267
OPTICAL SYSTEM
Filed March 31, 1930  3 Sheets-Sheet 1
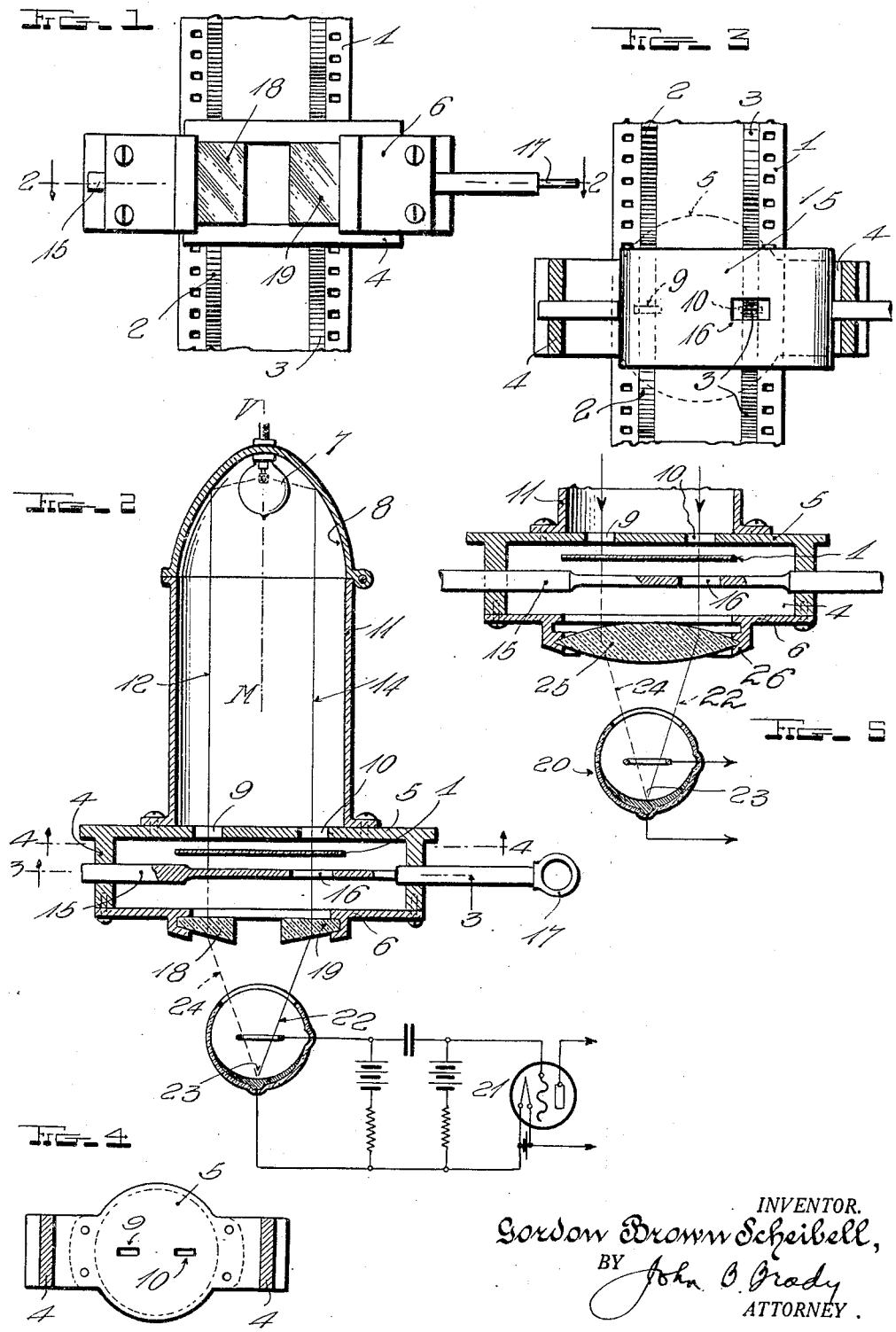

March 1, 1932.  G. B. SCHEIBELL  1,847,267
OPTICAL SYSTEM
Filed March 31, 1930   3 Sheets-Sheet 2
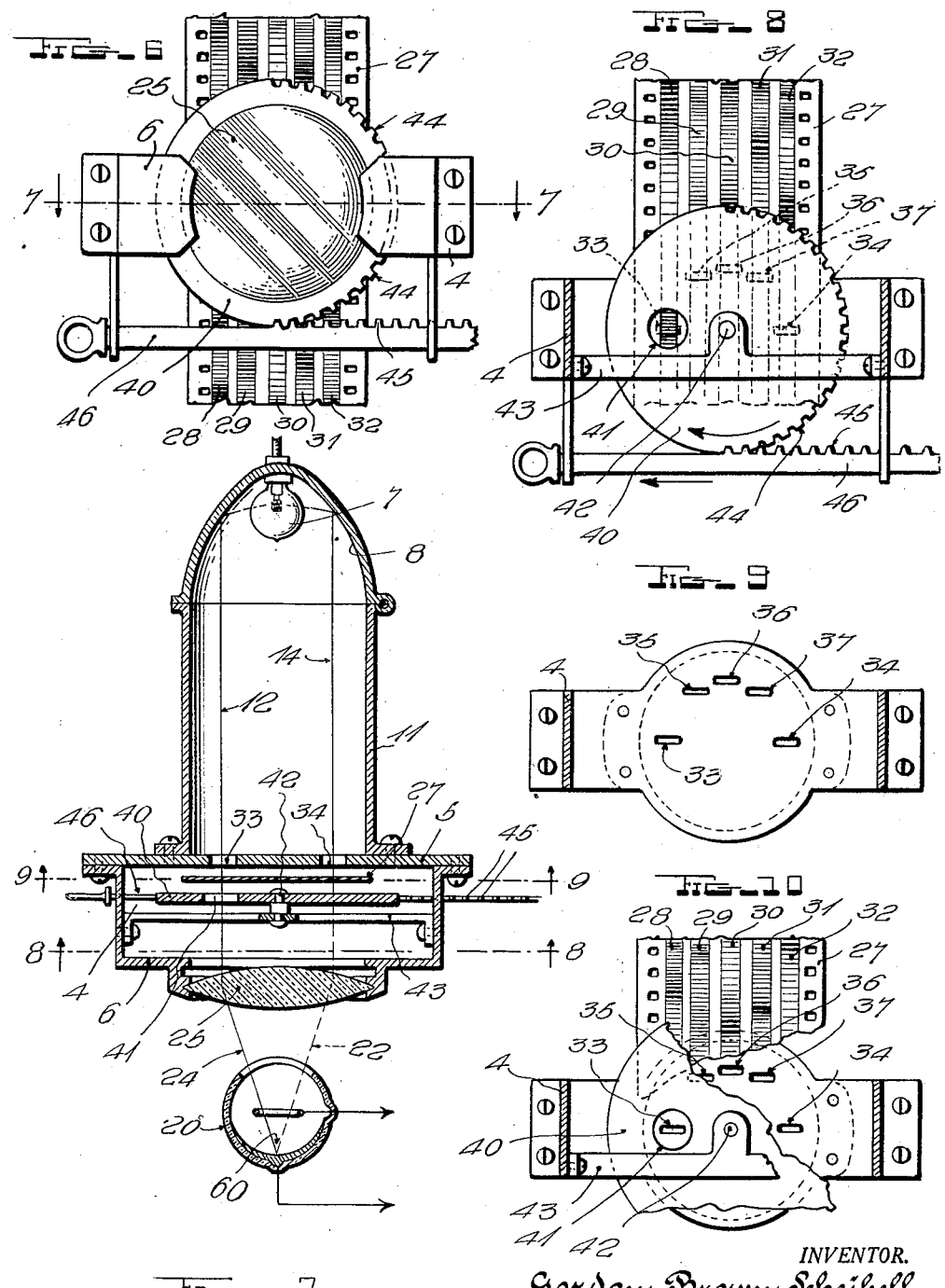
INVENTOR.
Gordon Brown Scheibell,
BY John B. Grady
ATTORNEY.

March 1, 1932.  G. B. SCHEIBELL  1,847,267
OPTICAL SYSTEM
Filed March 31, 1930   3 Sheets-Sheet 3
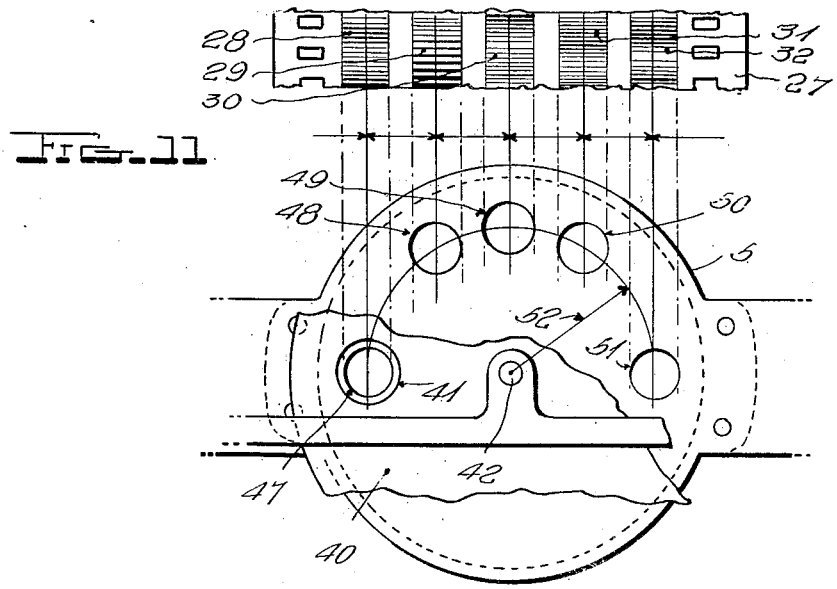
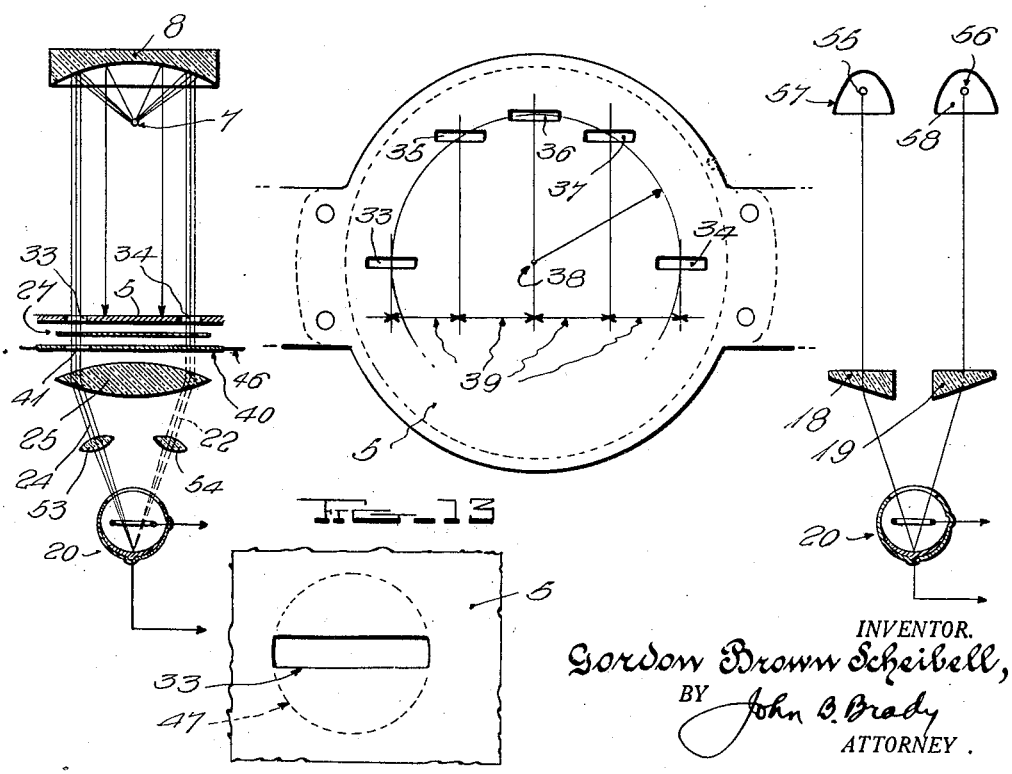
INVENTOR.
Gordon Brown Scheibell,
BY John B. Brady
ATTORNEY.

Patented Mar. 1, 1932

1,847,267

UNITED STATES PATENT OFFICE

GORDON BROWN SCHEIBELL, OF NEWARK, NEW JERSEY

OPTICAL SYSTEM

Application filed March 31, 1930. Serial No. 440,541.

My invention relates broadly to optical systems and more particularly to a system for selectively directing light rays upon light sensitive cells.

One of the objects of my invention is to provide a system for selectively directing rays of light from a source of parallel rays through a film having a multiple number of sound channels recorded thereon and upon the same spot of the light sensitive cell.

Another object of my invention is to provide an arrangement of light directing system for a multi-channel sound film in which light may be focused selectively upon the same spot of a photoelectric cell by a system of parallel rays and a selecting shutter for directing the light under substantially identical conditions through any one of the sound channels on the film.

A further object of my invention is to provide a construction of shutter for a multi-channel sound film system whereby a beam of light may be selectively directed through any one of the sound channels and concentrated upon a light sensitive cell under substantially equal conditions.

Other and further objects of my invention reside in an optical system designed to converge variable light rays from any one of a multiplicity of sound channels recorded upon a film for concentration upon a single point of a light sensitive cell.

My invention contemplates the symmetrical distribution of light rays through any one of a multiplicity of sound channels on a sound film for converging the light beams on a single point of a photoelectric cell. If the light beam is caused to fall on different parts of the photoelectric cell when different sound channels thereon are being reproduced, there will be a disturbing difference between the performance obtained from the different sound channels. There is a change in resistance, due to non-uniformity of the photoelectric cell structure, which is brought about by the shifting of the light beam from one position on the photoelectric cell to another position thereon so that the reproduction may be of large amplitude in one instance and of low amplitude at another instance. By my invention I establish a multiplicity of parallel light beams which are directed through all sound channels recorded on the sound film with equal intensity. A particular sound channel is selected for reproduction by movement of a shutter which directs the light rays which pass through one of the sound channels through an optical system and upon a photoelectric cell. The shutter by which the selection of any one of the sound channels is controlled is shifted with respect to the film in such manner that the light which is permitted to pass through the film and through the optical system always impinges upon the same spot on the photoelectric cell, thereby insuring uniform operation of the photoelectric cell independently of the particular sound channel which is selected.

My invention will be more fully understood by reference to the following specification and the accompanying drawings, in which:

Figure 1 is a front elevation showing one arrangement of optical system and sound film embodying my invention; Fig. 2 is a horizontal cross-sectional view taken through the sound film, associated optical system and photoelectric cell arranged according to my invention; Fig. 3 is a cross-sectional view on line 3—3 of Fig. 2 showing the arrangement of the selector means for rendering effective one of the two sound channels recorded on the film illustrated in Fig. 1; Fig. 4 is a cross-sectional view through the optical system on line 4—4 of Fig. 2 showing in elevation the structure employed for admitting light rays from the parallel light beams to the sound film; Fig. 5 is a cross-sectional view of a modified form of optical system employing my invention; Fig. 6 is an elevational view of a further modified form of my invention;

Fig. 7 is a horizontal cross-sectional view taken through the modified form of optical system of my invention on line 7—7 of Fig. 6; Fig. 8 is a cross-sectional view illustrating the selector mechanism employed in the arrangement of optical system shown in Fig. 7 on line 8—8 of Fig. 7; Fig. 9 is a cross-sectional view on line 9—9 of Fig. 7 and showing the aperture plate by which parallel light rays are admitted to the film; Fig. 10 is an elevational view with parts broken away to show the assembly of the aperture plate, the sound film and the selector mechanism in the optical system illustrated in Fig. 7; Fig. 11 is a modified form of selector mechanism and aperture plate illustrating the alignment of the apertures in the aperture plate with the several channels of the sound film; Fig. 12 is a theoretical view showing the method of spacing the optical slits in the aperture plate for reproduction of the multiple channel record on the sound film; Fig. 13 is a detailed view showing the manner in which a rectangular aperture may be formed from a circular aperture for selectively directing light rays upon a photoelectric cell; Fig. 14 is a theoretical view illustrating the manner in which light rays passing through selected apertures may be concentrated upon the same spot in the photoelectric cell for the uniform control of the cell; and Fig. 15 is a theoretical view of a modified arrangement of light distribution in which independent light sources may be converged upon a single photoelectric cell, the light being modulated by selected sound channels in a multi-channel sound film.

My invention employs a sound film designated by reference character 1 having a multiplicity of sound channels recorded thereon as designated at 2 and 3. The film 1 is moved through a casing 4 shaped to receive light rays through apertures in one wall 5 thereof and to direct light rays selectively through an optical system carried by the opposite wall 6 thereof. A source of light 7 is mounted within the parabolic reflector 8 in such a position that light is reflected therefrom in substantially parallel beams. The source of light 7 is to all practical purposes a point source and is located at the focus of the parabolic reflector in such manner that all the light reflected will pass off substantially parallel to the axis VM. A plurality of parallel rays is thus established and is directed toward the plate 5 of the casing 4. In order to admit the parallel rays through the casing 4 at selected positions conforming to the positions of the sound channels 2 and 3 on the sound film 1, apertures 9 and 10 are cut in the plate 5. These apertures 9 and 10 are symmetrical with respect to the axis VM through the focus of the parabolic reflector. Inasmuch as the resistance of a photo sensitive cell is proportional to the intensity of the light impinged thereon, it is of importance to employ pencils of light of substantially equal intensities. It is obvious that light reflected in parallel lines from a parabolic reflector is not of uniform luminous flux when viewed from a plane at right angles to the axis of the focus of the reflecting parabola, such as the plane represented by the wall 5 in Fig. 2. However, the apertures 9 and 10 are symmetrically positioned with reference to the axis VM and the two bundles of light rays defined by the apertures 9 and 10 will comprise two light pencils of equal intensities. A hood 11 extends between the parabolic reflector 8 and the plate 5. The sound channels 2 and 3 on the film 1 are thus equally exposed to the effects of light rays from the point source 7 along the parallel pencils designated as 12 and 14. In order to select a particular sound channel, I mount a shutter 15 for lateral movement across the path of the sound film 1 to a position in which an aperture 16 contained therein may be aligned with the sound channel 2 or 3 on the film 1 and with the apertures 9 or 10 in the plate 5. The shutter 15 is manually shiftable from the exterior of casing 4 by movement of the control member 17, the shutter being slidable through opposite ends of the casing 4. The wall 6 of the casing 4 serves to support prism plates 18 and 19 in alignment with the apertures 9 and 10 in the plate 5. The prism plates are shaped with diverging faces extending outside of casing 4, the prism plates employing the refracting properties thereof for changing the direction of the light pencils 12 or 14 for focusing either of the light pencils upon photoelectric cell 20. The photoelectric cell is included in the input circuit of electron tube 21 which may lead to a sound reproducing system. The light is shown concentrated through prism plate 19, in Fig. 2, the shutter 15 being moved to align aperture 16 with the sound channel 3 on the film 1, the light passing through aperture 10 in its path of travel from the point source 7. The light rays are directed from the prism 19 upon the photoelectric cell 20 along the path designated at 22. However, the light may be concentrated on the same point 23 in the photoelectric cell 20 over the path 24 when the shutter 15 is moved to cut off the light from the source 7 through sound channel 3 and to select the light from source 7 through sound channel 2. It will be observed that the prisms are so arranged that the light is concentrated upon the photoelectric cell 20 at point 23 in both instances. The light does not fall on two different points in the photoelectric cell, depending upon whether the light arrives via one sound channel or the other sound channel, but the point of application of the light upon the photoelectric cell remains constant irrespective of the shift of shutter 15.

Fig. 3 indicates the arrangement of shutter 15 more clearly. An aperture 16 is shown in a position by which sound channel 3 is framed. In dotted lines behind the film 1, I have indicated the light aperture 10. Sound channel 2 as shown by the position of the shutter in Fig. 3 is entirely masked. I have, however, indicated in dotted lines the relative position of aperture 9 behind the film 1 which is ineffective for passing light to the optical system with the shutter 15 moved to the position illustrated.

In Fig. 5, I have shown a modified form of optical system, and in lieu of the prism plates 18 and 19, I provide a concentrating lens 25 mounted in lens carrier 26 supported by the end wall 6. The photoelectric cell 20 is subjected to the effects of light rays passing either along path 22 or along path 24 and striking the photoelectric cell at the same point indicated at 23.

In Fig. 6, I have shown a sound film 27 having sound channels 28, 29, 30, 31 and 32 recorded thereon in parallel spaced relation. A casing 4 similar to the casing described in Figs. 1–5 is employed and a similar method is provided for subjecting the film 27 to the effects of parallel light rays from the point source 7. In this instance, however, a special arrangement of apertures must be provided in the rear plate 5 of the casing. I have indicated two such apertures at 33 and 34 adapted to align with the sound channels 28 and 32 on the sound film 27. However, additional light apertures 35, 36 and 37 are provided and distributed as shown in Fig. 12 around the common center 38 but each extending along a horizontal axis and spaced equal diametrical distances 39 from one another.

In order to select the sound channel of the several sound channels 28, 29, 30, 31 and 32 through which light may pass and be focused upon the photoelectric cell 20, I provide a disc shutter 40 having a selecting aperture 41 therein. The disc shutter 40 is pivotally mounted at 42 on frame member 43 which extends across casing 4. One edge of the shutter 40 is provided with teeth 44 throughout 180 degrees of its orbital path. The teeth 44 on the edge of disc 40 mesh with teeth 45 formed on rack 46, which rack is shiftable laterally of the film system to move aperture 41 to a position in alignment with any one of the apertures 33, 35, 36, 37 or 34 which are provided in plate or wall 5. In the position shown the rotary shutter 40 is moved to a position where light beam 12 passes through aperture 41 and slit 33 and is directed upon the single point 60 of photoelectric cell 20 along the path 24 through the converging lens 25 for reproducing sound according to variations in light which are recorded in sound channel 28. Should the rotary shutter 40 be shifted to align aperture 41 with the slit 34, the light no longer passes through the sound channel 28 but is shifted therefrom and passes through sound channel 32 along the path indicated at 22. By shifting rotary disc 40 in a clockwise direction by moving rack 46 to the left, the aperture 41 is shifted from alignment with aperture 33 and moved into alignment with aperture 35 for the reproduction of sound from the sound channel 29. Further movement of rack 46 operates to shift aperture 41 to a position registering with slit 36 in alignment with the sound record 30 while cutting off the passage of light rays through the other sound channels. I may continue to revolve rotary disc 40 to register aperture 41 with slit 37 for the reproduction of sound which is recorded in channel 31. A further shift in position of aperture 41 serves to register aperture 41 with slit 34 for the reproduction of sound in channel 32 along the path 22 as heretofore described. Movement of the rotary shutter 40 in the manner described with the light extending in parallel rays from the point source 7 serves to select light pencils of equal intensity for passage through the several sound channels on the multiple channel film.

In Fig. 11, I have shown the plate 5 as provided with circular apertures 47, 48, 49, 50 and 51 in lieu of the rectangular apertures 33, 35, 36, 37 and 34 illustrated in Fig. 9. In this way, a large amount of light may be passed through each sound channel 28, 29, 30, 31 and 32 by the selective registering of aperture 41 in rotary shutter 40 with any one of the apertures 47, 48, 49, 50 and 51 in plate 5. The apertures in plate 5 are all formed on the same radius 52 and it will be observed that the size of the apertures is such as to adequately cover the sound channel on the multiple record film 27. It is obvious that, due to the symmetrical arrangement about a common axis, such an arrangement of apertures defines light rays reflected by a parabolic reflector into light pencils of equal illumination intensities.

In Fig. 13, I have shown the method which may be employed for developing a rectangular slit 33 from the circular aperture 47 which has been shown in dotted line arrangement.

In Fig. 14, I have shown a theoretical view of a multiplicity of parallel rays which are directed against the apertured wall 5 from the parabolic reflector 8 and point source of light 7. After a selected beam is passed through the film 27 by the selective positioning of rotary shutter 40 and the aligning of aperture 41 therein with the apertures on slits in plate 5, these light beams may be converged through lens 25 upon photoelectric cell 20 over the separate paths 24 or 22, etc., through the individual auxiliary optical systems designated by means of lenses 53 disposed in the path 24 and 54 disposed in the path 22. By use of the auxiliary optical systems, the converging light beams may be focused more accurately upon a selected part of the photoelectric cell 20.

Where it is more desirable, for certain reasons, to employ two light sources, I provide independent sources of light 55 and 56 with separate parabolic reflectors 57 and 58 as shown in Fig. 15, each of which serves to direct a pencil of light rays independently through the separate prisms 18 and 19 upon a single point of photoelectric cell 20.

Different shapes of apertures may be arranged wherever required and the light from the several sound channels may be so impressed upon the photoelectric cell through the apertures of selected cross-sections as to secure the required volume of reproduced sound. While separate sources of light may be employed, the intensity thereof must be matched and the same point in the photoelectric cell must be exposed to light in accordance with the selection of the sound channel across the film.

While I have described my invention in a number of preferred embodiments, I desire that it be understood that the illustrations herein may be varied in various forms in carrying out the principles of my invention, and that no limitations upon my invention are intended other than are imposed by the scope of the appended claims.

What I claim as new and desire to secure by Letters Patent of the United States is as follows:

1. An optical system comprising, a photo sensitive cell, a source of light, means adapted to establish a plurality of pencils of light of substantially equal luminous flux from said light source and means for directing all of said pencils of light upon the same area of said photosensitive cell.

2. In an optical system, a concentrated filament light source, means for establishing a multiplicity of parallel rays of light from said source, a sound film having a multiple number of sound channels recorded thereon, light apertures for defining bundles of light rays of equal aggregate intensity from the parallel rays of light from said source, a photoelectric cell, and a lens system for focusing said bundles of light rays on said photoelectric cell.

3. In an optical system, a source of light, means for establishing parallel pencils of light from said source of light, a sound film having a multiple number of sound channels recorded thereon, means for subjecting the sound channels on said film to the equal effects of said light pencils, a photoelectric cell, a lens system for focusing light rays upon the same area of said photoelectric cell, and a selector movable with respect to said film and adapted to select any one of said light pencils to fall on said photoelectric cell.

4. The method of directing variable light rays upon the same spot in a photoelectric cell from a plurality of sound channels recorded on a film which consists in establishing a plurality of parallel rays of light from a point source of light, defining said light rays in light pencils of equal intensities, subjecting the film to the uniform effect of said pencils, selecting the light pencils which pass through any one of the several channels on said film and converging the light pencils so selected upon a photoelectric cell.

5. The method of uniformly exciting a photoelectric cell by light rays directed from different angular positions upon said cell which consists in establishing a plurality of light pencils of substantially equal intensity from a common light source, subjecting a multiple channel sound film to the effects thereof, selecting any one of the light pencils which pass through any one of the channels on said sound film, and converging any one of said light pencils thus selected upon one area of a photoelectric cell.

6. The method of uniformly exciting a photoelectric cell under control of a multiple channel sound film which comprises establishing a plurality of rays of light in parallel beams from a single source of light, subjecting the multiple channel sound film to the uniform effects of the rays of light thus established, selecting the rays of light passing through any one of the channels on the sound film and always converging all of the light rays so selected upon the same area of the photoelectric cell.

7. In an optical system for reproducing sound, means for producing parallel light rays from a single source of light, means for defining the light rays in light beams of equal intensity, a multiple channel sound film, a photoelectric cell, a lens system disposed between said photoelectric cell and said multiple channel sound film, and means for selecting any one of the defined beams of light and converging the light thus selected upon the same area of said photoelectric cell.

8. In an optical system for the reproduction of sound, means for establishing a plurality of parallel light rays, means for defining the light rays in light beams of substantially equal intensity, a multiple channel sound film, a photoelectric cell, an aperture plate transversely movable with respect to said film, and means for converging a selected beam from said parallel light rays modulated according to a selected sound channel on said sound film to one localized area of said photoelectric cell.

9. An optical system comprising, a source of light, a film, means for directing light beams of substantially equal intensity from said source through different longitudinal portions of said film, and a plurality of prisms for refracting said light beams emerging from said film, said prisms being aligned with different longitudinal portions of said film.

10. In a system for the reproduction of sound under control of a multiple channel sound film, the combination of means for establishing a plurality of parallel light rays from a point source of light, a multiple channel sound film, means for uniformly subjecting each of the channels on said sound film to the uniform intensities of the light rays thus established, a photoelectric cell, a selector for selecting the light rays passing through any one of the sound channels on the sound film and reflective means for converging the said rays upon the same area of said photoelectric cell.

11. In a system for the reproduction of sound from a multiple channel sound film, means for establishing a plurality of parallel light beams from a common source of light, a sound film having a multiple number of sound channels recorded thereon, a plate member having a multiplicity of apertures therein corresponding in number to the number of sound channels on said film, each of the apertures in said plate member being aligned with one of the sound channels on said film, a photoelectric cell, a lens system, and a shutter interposed between said film and said lens system, said shutter having an aperture therein adapted to be aligned with any selected aperture in said plate for directing light rays through a selected sound channel upon said lens system and converging the light rays upon said photoelectric cell.

12. In a system for reproducing sound from a multiple channel sound film, the combination of means for establishing a plurality of light beams of equal intensity from a common light source, a sound film having a multiple number of sound channels thereon, means interposed in the path of said light beams for exposing each of the sound channels on said film to light of uniform intensity, photoelectric cell, a lens system, and a movable shutter disposed between said sound film and said lens system, said movable shutter having an aperture therein registrable with any one of the sound channels on said sound film for selectively directing light rays from said beams modulated in accordance with any one of said sound channels upon the same spot in said photoelectric cell.

13. In a system for reproducing sound under control of a sound film having a multiple number of sound films recorded thereon, in combination means for establishing a plurality of parallel light beams, a casing, a sound film having a multiple number of sound channels recorded thereon and movable through said casing, means in said casing subject to the effects of said parallel light rays for uniformly illuminating each of the sound channels on said film, a photoelectric cell, a lens system carried by said casing for directing said light beams upon the same area of said photoelectric cell, and a shutter movable in the path of the light beams passing through said sound film, said shutter being apertured for selectively directing the light rays passing through any one of the sound channels on the sound film upon the same point in said photoelectric cell.

14. In a system for reproducing sound from a multiple channel sound film, means for establishing a plurality of parallel light rays from a common light source, a sound film having a multiple number of sound channels recorded thereon, means for illuminating the channels on said sound film with light of uniform intensity, a photoelectric cell, and means for selectively directing a light beam modulated in accordance with any one of the sound channels on said film upon the same spot on said photoelectric cell.

15. In combination with a moving photographic film, the method of producing a selected one of a plurality of adjacent longitudinal photographic records on a film which consists in directing a plurality of light beams which originate from a substantially point light source through the film in symmetrically located positions with respect to said light source, said light beams being of substantially equal luminous flux.

16. In combination with a moving photographic film having adjacent longitudinal sound record channels the method of employing a plurality of light beams, corresponding to the sound channels which originate from a common light source and are symmetrically located with reference to the source and of equal basis intensity, which consists in directing selected beams through the film and converging the beams upon the same localized area of a single light sensitive resistance.

17. An optical system comprising, a photo sensitive cell, means for producing a plurality of pencils of light of substantially equal intensities, and refractive means for directing all of said pencils of light upon the same area of said photo sensitive cell.

18. In an optical system, a point source of light, a photosensitive cell, a film, means for deriving from said point source of light a plurality of independent light channels and simultaneously directing said light channels against the film, and means for exposing said photosensitive cell uniformly to said independent light channels.

19. In an optical system, a point source of light, a film, means for deriving a plurality of independent light channels from said point source of light, means for directing said light channels against said film and refractive means adjacent said film for converging any one of the light channels passing through said film upon the same focal point.

20. An optical system comprising a point source of light, a film, means for deriving a multiplicity of independent light channels from said point source of light and directing all of the channels of light against the film, means for selectively passing any one of the light channels through said film and refractive means for converging any one of the light channels thus passed through said film upon the same focal point.

In testimony whereof I affix my signature.

GORDON BROWN SCHEIBELL.

CERTIFICATE OF CORRECTION.

Patent No. 1,847,267.  March 1, 1932.

GORDON BROWN SCHEIBELL.

It is hereby certified that error appears in the printed specification of the above numbered patent requiring correction as follows: Page 5, line 14, claim 10, for "reflective" read "refractive"; and that the said Letters Patent should be read with this correction therein that the same may conform to the record of the case in the Patent Office.

Signed and sealed this 24th day of October, A. D. 1933.

(Seal)

F. M. Hopkins
Acting Commissioner of Patents.